United States Patent [19]
Neitz

[11] Patent Number: 5,363,820
[45] Date of Patent: Nov. 15, 1994

[54] COMBUSTION CHAMBER FOR AIR COMPRESSING, SELF-IGNITING INTERNAL COMBUSTION ENGINES

[75] Inventor: Alfred Neitz, Wendelstein, Germany
[73] Assignee: Man Nutzfahrzeuge AG, München, Germany
[21] Appl. No.: 112,696
[22] Filed: Aug. 25, 1993
[30] Foreign Application Priority Data
Aug. 27, 1992 [DE] Germany ............................ 4228518
[51] Int. Cl.$^5$ .................................................. F02F 7/00
[52] U.S. Cl. .................... 123/193.1; 123/294; 123/667
[58] Field of Search ................. 123/193.1, 193.6, 294, 123/661, 663, 664, 667

[56] References Cited
FOREIGN PATENT DOCUMENTS
898108  1/1982  U.S.S.R. ............................ 123/193.6

Primary Examiner—Noah P. Kamen
Attorney, Agent, or Firm—Robert W. Becker & Associates

[57] ABSTRACT

A combustion chamber shape for air-compressing, self-igniting internal combustion engines is designed such that fuel injection jets ejected from a multiport injection valve positioned on the cylinder axis do not come into contact with the walls of the combustion chamber. For this purpose, the piston bottom is conically shaped whereby the slant of the conical surface is selected such that the piston bottom is adapted to the contour of the widening injected fuel jet. The cylinder head bottom is designed as a spherical segment, also with the goal that the fuel injection jet does not come into contact with the combustion chamber walls. The conically designed piston bottom may have radially extending depressions when the combustion chamber is very small in order to achieve high compression ratios. With the depressions it is ensured that despite the small distance between the piston bottom and the cylinder head bottom the injected fuel jet does not come into contact with the combustion chamber walls so that an incomplete combustion is prevented.

4 Claims, 4 Drawing Sheets

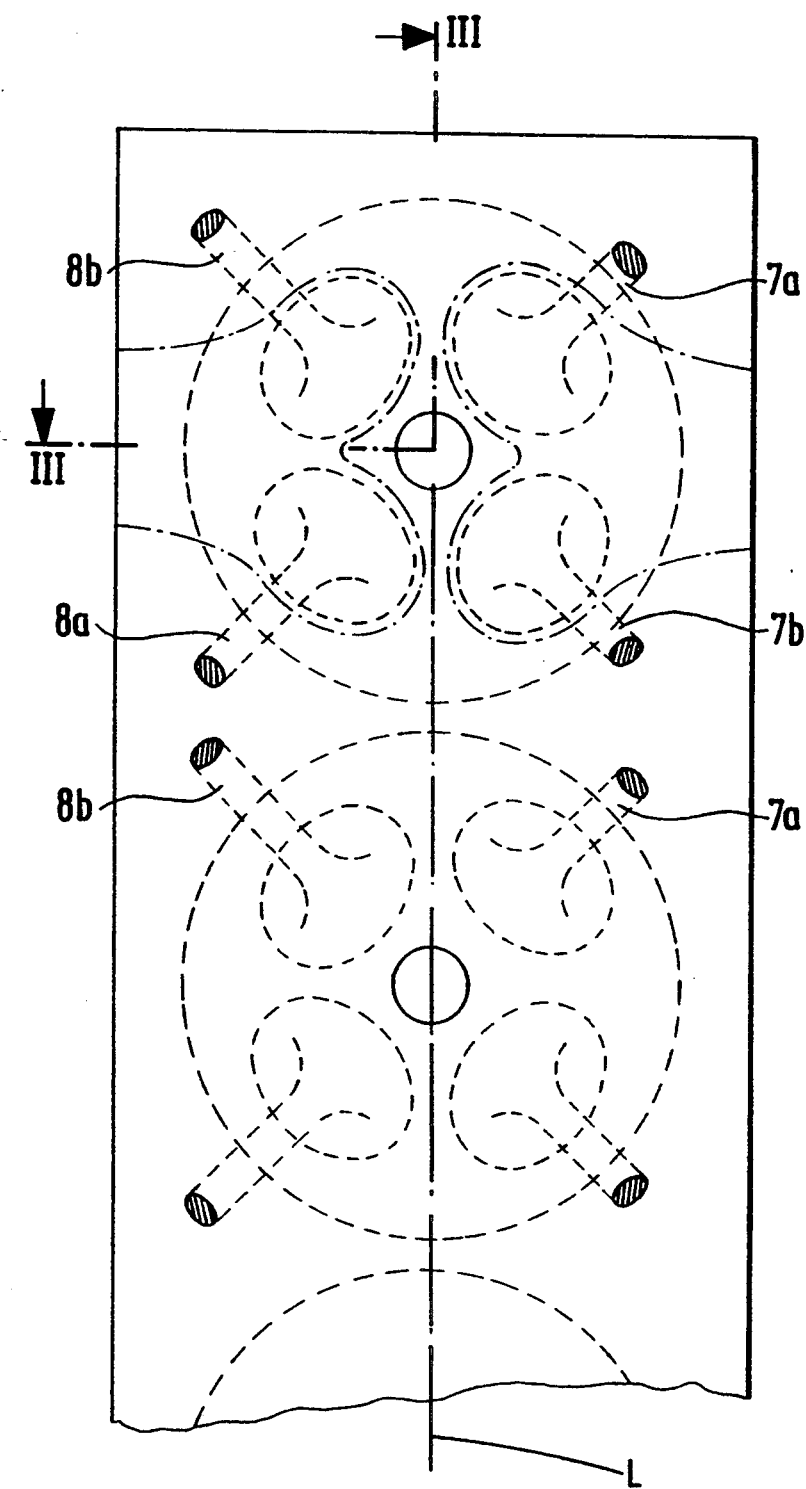

COMBUSTION CHAMBER FOR AIR COMPRESSING, SELF-IGNITING INTERNAL COMBUSTION ENGINES

BACKGROUND OF THE INVENTION

The present invention relates to the shape of a combustion chamber for air compressing, self-igniting internal combustion engines in which the combustion chamber is delimited by a cylinder, a cylinder head bottom, and a piston bottom and wherein the cylinder head has a multiport injection valve and is provided for the gas exchange with valve openings for at least one intake valve and at least one exhaust valve.

The combustion chamber of direct-injecting internal combustion engines is delimited by the cylinder, i.e., by its inner cylinder wall, the cylinder head, and the piston bottom. For improving the peripheral conditions for the increase of the indexed efficiency, diverse shapes have been developed which, however, with respect to an optimal combustion have not satisfactorily taken into consideration the improvement of the exhaust gas quality.

It is therefore an object of the present invention to provide a shape of a combustion chamber for a given piston diameter with which the free length of the injected fuel jet is as great as possible and for all injection jets identical without fuel droplets coming into contact with the combustion chamber walls before combustion takes place.

BRIEF DESCRIPTION OF THE DRAWINGS

This object, and other objects and advantages of the present invention, will appear more clearly from the following specification in conjunction with the accompanying drawings, in which:

FIG. 4 shows a plan view of a multi-cylinder internal combustion engine with four valves per cylinder.

SUMMARY OF THE INVENTION

Figure 1:
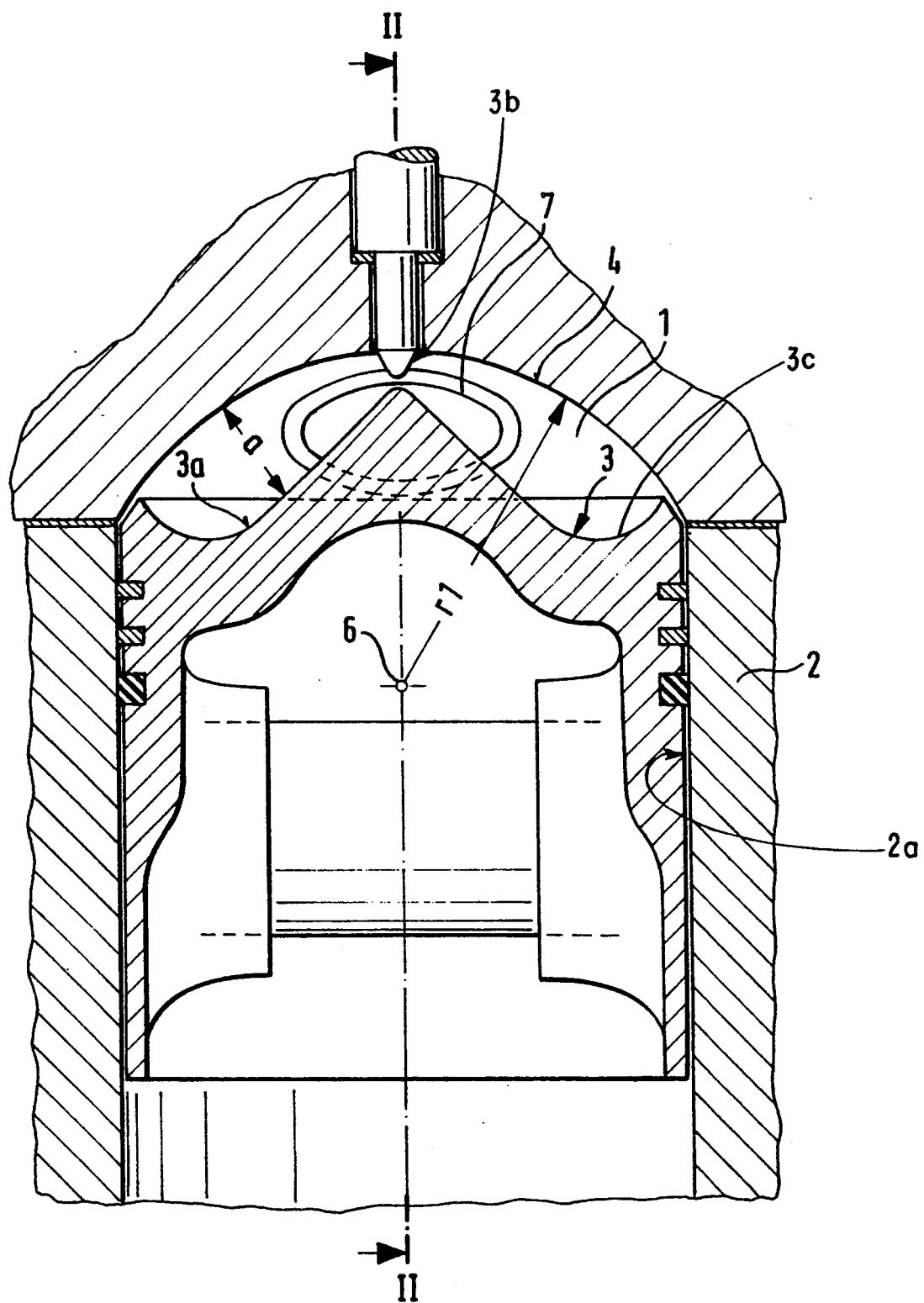
FIG. 1 shows a section along the line I—I of FIG. 2 for representing the spherical segment shape of the cylinder head.

According to the present invention the combustion chamber, respectively, its shape, for an air-compressing, self-igniting internal combustion engine with a multiport injection system is primarily characterized by:

A first delimiting surface in the form of an inner cylinder wall of a cylinder;

A second delimiting surface in the form of a cylinder head bottom having openings for one intake valve and one exhaust valve;

A third delimiting surface in the form of a piston bottom;

The second delimiting surface shaped as a spherical segment with a radius of curvature $r_1$, wherein a point of origination of the radius is on a cylinder axis of the cylinder;

The third delimiting surface shaped partially as a rotation-symmetrical surface, wherein a slant of the rotation-symmetrical surface is such that, beginning at an end of the rotation-symmetrical surface proximal to the second delimiting surface and proceeding in a direction toward a distal end of the rotation-symmetrical surface, a distance between the rotation-symmetrical surface and the second delimiting surface increases corresponding to a widening of a contour of the injected fuel jet ejected from the multiport injection system; and The openings, when viewed in a direction of the cylinder axis, arranged transverse to a longitudinal axis of the internal combustion engine.

Preferably, the rotation-symmetrical surface has a conical shape.

Advantageously, the third delimiting surface, viewed in a direction toward the cylinder axis, has radially extending depressions, with a cross-section of the radially extending depressions being adapted to a shape of the injected fuel jets ejected from the multiport injection system.

Expediently, the control times of the intake and exhaust valves and the multiport injection system are adjusted for a four-stroke operating mode or, in the alternative, for a two-stroke operating mode.

Due to the embodiment of the cylinder head in the shape of a spherical segment and due to the conical shape of the piston bottom in connection with the centrally arranged injection valve of the multiport injection system, the injected fuel jets have the opportunity to travel over a great free length without fuel droplets prematurely contacting one of the delimiting surfaces of the combustion chamber and being cooled so that they are not vaporized, mixed with air and combusted in an optimal manner. Due to the inventive shape of the combustion chamber, a contribution for improving the exhaust gas quality is provided.

According to a second embodiment of the present invention, the shape of the combustion chamber is primarily characterized by:

A first delimiting surface in the form of an inner cylinder wall of a cylinder;

A second delimiting surface in the form of a cylinder head bottom having openings for two intake valves and two exhaust valves;

A third delimiting surface in the form of a piston bottom;

The second delimiting surface comprised of a first spherical segment with a first radius of curvature $r_2$ and a second radius of curvature $r_3$, wherein a point of origination of the first and the second radii is on a cylinder axis of the cylinder;

The first spherical segment positioned in a first plane defined by the cylinder axis and a longitudinal axis of the internal combustion engine;

The second spherical segment positioned in a second plane extending at a right angle relative to the longitudinal axis of the internal combustion engine from the cylinder axis, wherein in planes of the cylinder axis between the first and the second plane the first and the second spherical segments have a continuous transition into one another;

The third delimiting surface having a slant such that, beginning at an end of the third delimiting surface proximal to the second delimiting surface and proceeding in a direction toward a distal end of the third delimiting surface, a distance between the third delimiting surface and the second delimiting surface increases corresponding to a widening of a contour of an injected fuel jet ejected from the multiport injection system; and The openings, when viewed in a direction of the cylinder axis, arranged diagonal to a longitudinal axis of the internal combustion engine.

Preferably, the third delimiting surface, viewed in a direction toward the cylinder axis, has radially extending depressions, with a cross-section of the radially extending depressions being adapted to a shape of an injected fuel jet ejected from the multiport injection system.

Expediently, the control times of the intake and exhaust valves and the multi-port injection system are adjusted for a four-stroke operating mode, or, in the alternative, for a two-stroke operating mode.

In internal combustion engines with high compression ratios, the space between the piston bottom and the cylinder head is so small that the periphery of the widening contour of the injection jet would come into contact with the delimiting surfaces (walls) of the combustion chamber. This is prevented by the inventive radial depressions within the piston bottom.

DESCRIPTION OF PREFERRED EMBODIMENTS

The present invention will now be described in detail with the aid of several specific embodiments utilizing FIGS. 1 through 4.

Figure 2:
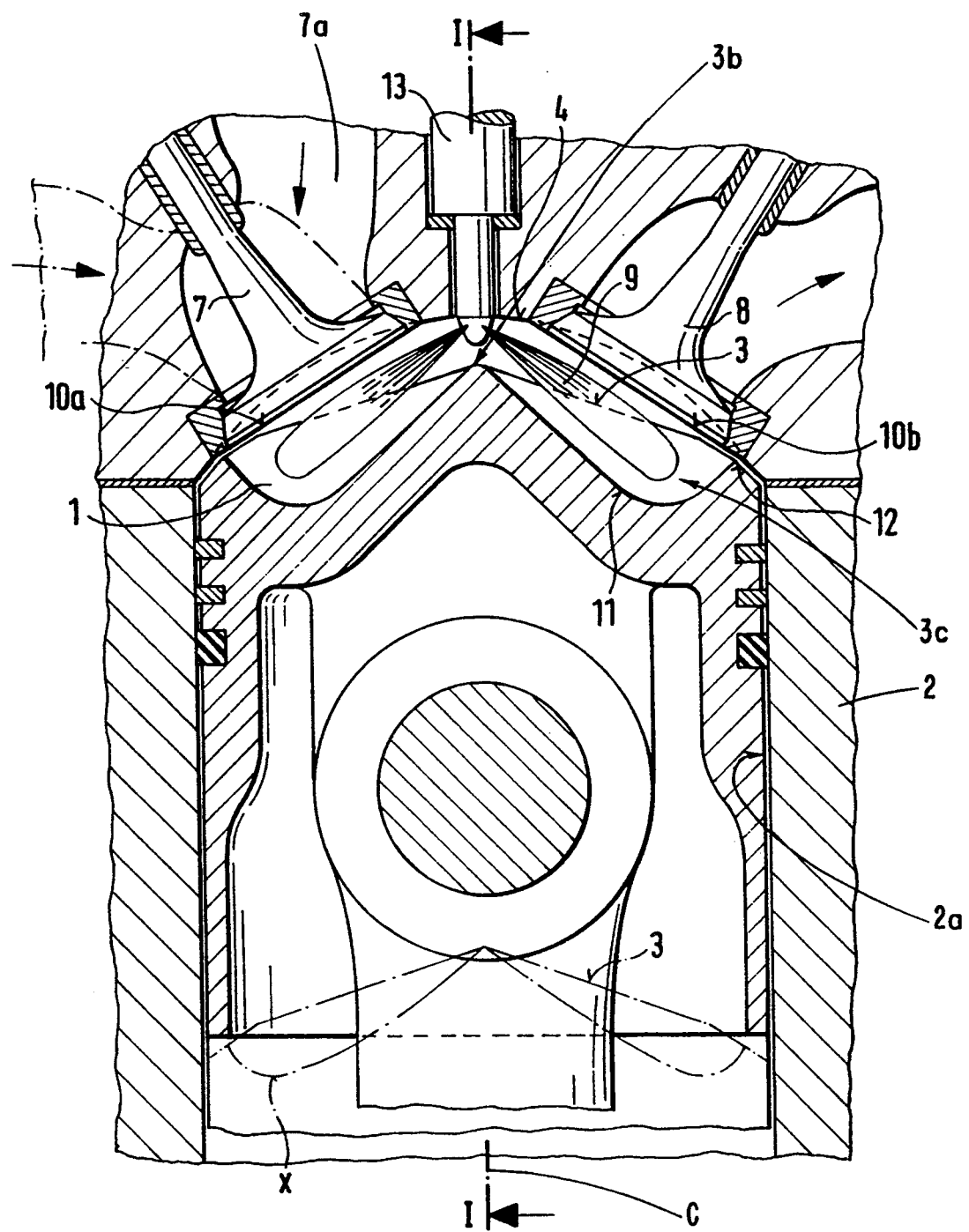
FIG. 2 shows a section along line II—II of FIG. 1 of a combustion chamber having one intake valve and one exhaust valve.

FIG. 1 shows schematically the contour or shape of the combustion chamber 1 in a section along line I—I of FIG. 2. The combustion chamber 1 has a first delimiting surface in the form of the inner walls 2a of the cylinder 2, a second delimiting surface in the form of the piston bottom 3, and a third delimiting surface in the form of a cylinder head bottom 4. The cylinder head bottom 4 is embodied as a spherical segment with a radius of curvature $r_1$ whereby the radius has a point of origination 6 on the axis C of the cylinder. The piston bottom 3 is a rotation-symmetrical surface 3a. The gas exchange is performed by at least one intake valve 7 and at least one exhaust valve 8 (FIG. 2). An injection valve 13 is positioned on the cylinder axis C and beginning at the injection valve 13, the distance a between the cylinder head bottom 4 and the surface 3a increases steadily from the proximal end 3b to the distal end 3c so that the injected fuel jets 9 (FIG. 2) do not come into contact with the delimiting surfaces or walls of the combustion chamber.

The slant of the surface 3a is selected such that the injected fuel jets originating from the multiport injection valve 13 do not come into contact with the surface 3a of the piston bottom 3 or the surfaces 10a, 10b of the intake, respectively, exhaust valves 7 and 8 or the cylinder head bottom 4. It is presupposed that the bores of the injection valve 13 be distributed evenly over the circumference of the multiport injection valve such that each injected fuel jet has the same peripheral conditions.

For a high compression ratio the distance between the cylinder head bottom 4 and the surface 3a is so small that the injected fuel jets 9 with their peripheral zones come into contact with the delimiting surfaces (walls) of the combustion chamber which leads to non-combusted fuel components within the exhaust gas. Therefore it is suggested, as shown in the embodiment of FIG. 2, that the piston bottom 3 is provided with depressions 11. These depressions 11, for high compression ratios, are adapted, as is the curvature of the surface 3a for low compression ratios, to the contour of the widening injected fuel jet 9.

For the protection of the inner cylinder wall and for reducing the cylinder dead space, the piston in its peripheral zone is provided with a skirt 12. The distance of the skirt 12 to the cylinder head bottom 4 is selected to be as small as possible in order to maintain the cylinder dead space as small as possible.

The embodiment according to FIG. 2 with an intake channel 7a that is parallel to the cylinder axis C is especially suitable for two-stroke operating modes. When the piston in the two-stroke operating mode is positioned at the lower dead center, the intake and exhaust valves 7, 8 are open in order to flush the combustion chamber 1. The lower dead center "X" of the piston is shown as a dash-dotted line in the drawing.

Figure 3:
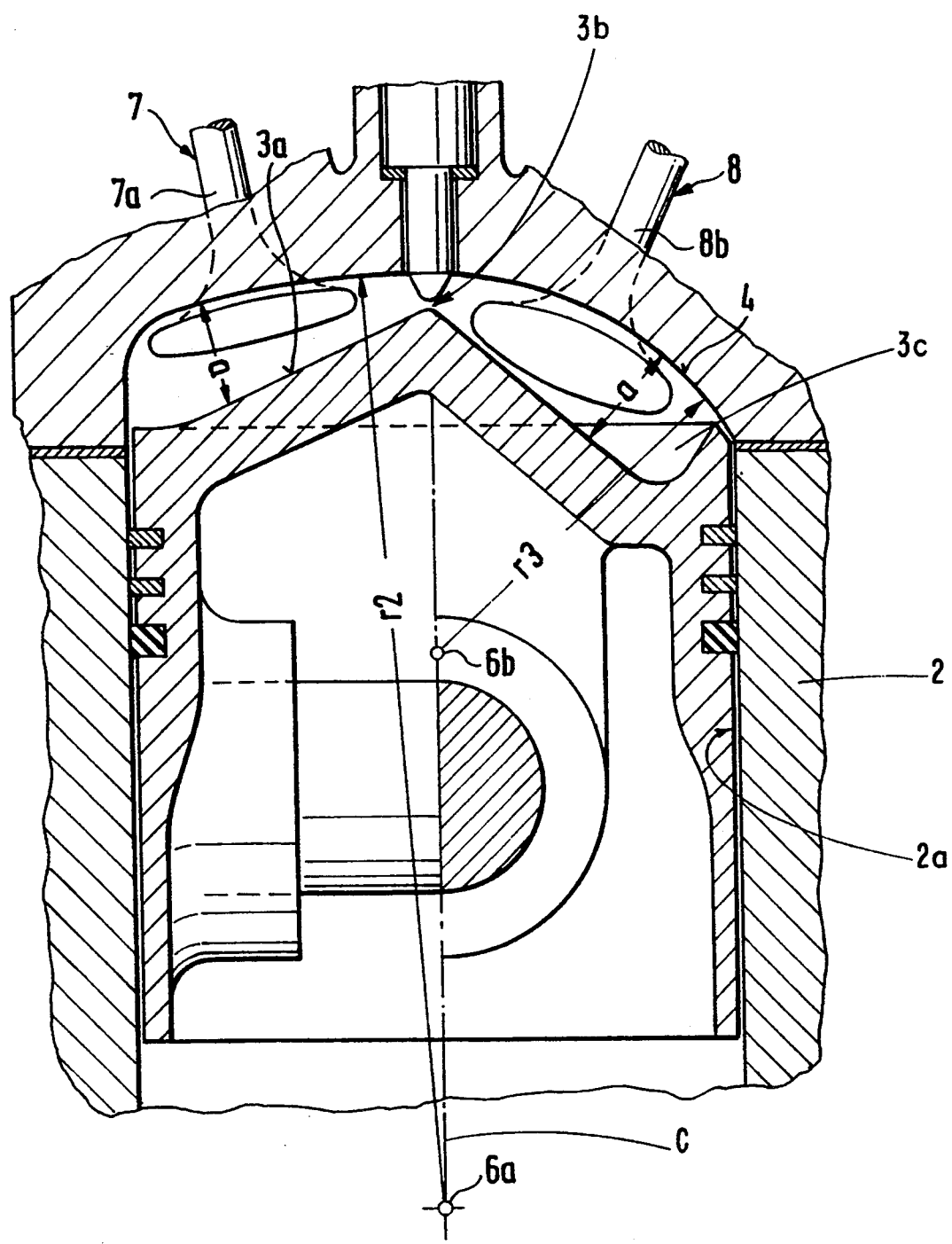
FIG. 3 shows a longitudinal and a transverse section along the line III—III of FIG. 4 of a combustion chamber with two intake valves and two exhaust valves.

FIG. 3 shows a longitudinal and transverse section along the line III—III of FIG. 4 indicating the contour of the cylinder head bottom 4 of the combustion chamber for four valves, i.e., two intake and two exhaust valves 7a, 7b and 8a, 8b. The cylinder head bottom 4 has a radius of curvature $r_2$ in a plane which is defined by the longitudinal axis L of the engine and the cylinder axis C whereby the point of origination of the radius $r_2$ is at 6a, while in the plane that is defined by the cylinder axis C in a direction perpendicular to the longitudinal axis L of the engine, the radius of curvature is $r_3$. The radius $r_3$ originates at the point 6b. The different radii are necessary because otherwise the strokes of the valves of neighboring cylinders would be obstructed, as is shown in FIG. 4. The piston bottom 3, with respect to the distance a, follows the contour of the cylinder head bottom 4 represented in FIGS. 1 and 2. For a constant distance from the cylinder axis, the distance a between the surface 3a and the cylinder head bottom 4 is always identical.

FIG. 4 shows schematically a plan view of the cylinder heads when four valves are used (FIG. 3). Each cylinder head is provided with two intake and two exhaust valves 7a, 7b and 8a, 8b the axes of which extend past the plane of the drawings. In order to prevent that the valves 7a, 7b and 8a, 8b of neighboring cylinders come into contact, the cylinder head bottom 4 is provided with two spherical segments that have a continuous transition into one another whereby the spherical segments have different radii of curvature $r_2$ and $r_3$ as shown in FIG. 3. The valves which extend perpendicular to the locally resulting surfaces of the cylinder head bottom 4 (FIG. 3) accordingly have a spacial position so that they do not obstruct the stroke of neighboring valves.

The extensions of the valve center lines of the intake and exhaust valves 7a, 7b and 8a, 8b must not always extend through the cylinder center.

The present invention is, of course, in no way restricted to the specific disclosure of the specification and drawings, but also encompasses any modifications within the scope of the appended claims.

What I claim is:

1. An air-compressing, self-igniting internal combustion engine comprising:
   a multiport injection system;
   a combustion chamber comprised of:
   a first delimiting surface in the form of an inner cylinder wall of a cylinder;
   a second delimiting surface in the form of a cylinder head bottom having openings for one intake valve and one exhaust valve;
   a third delimiting surface in the form of a piston bottom;

said second delimiting surface shaped as a spherical segment with a radius of curvature, wherein a point of origination of said radius is on a cylinder axis of the cylinder;

said third delimiting surface shaped partially as a rotation-symmetrical surface, wherein a slant of said rotation-symmetrical surface is such that, beginning at an end of said rotation-symmetrical surface proximal to said second delimiting surface and proceeding in a direction toward a distal end of said rotation-symmetrical surface, a distance a between said rotation-symmetrical surface and said second delimiting surface increases corresponding to a widening of a contour of an injected fuel jet ejected from the multiport injection system;

said openings, when viewed in a direction of the cylinder axis, arranged diagonally to a longitudinal axis of the internal combustion engine; and wherein said third delimiting surface, viewed in a direction toward said cylinder axis, has radially extending depressions, with a cross-section of said radially extending depressions being shaped according to a shape of the injected fuel jets ejected from the multiport injection system.

2. A combustion chamber according to claim 1, wherein said rotation-symmetrical surface has a conical shape.

3. An air-compressing, self-igniting internal combustion engine comprising:
a multiport injection system;
a combustion chamber comprised of:
a first delimiting surface in the form of an inner cylinder wall of a cylinder;
a second delimiting surface in the form of a cylinder head bottom having openings for two intake valves and two exhaust valves;
a third delimiting surface in the form of a piston bottom;
said second delimiting surface comprised of a first spherical segment with a first radius of curvature and a second radius of curvature, wherein a point of origination of said first and said second radii is on a cylinder axis of the cylinder;
said first spherical segment positioned in a first plane defined by the cylinder axis and a longitudinal axis of the internal combustion engine;
said second spherical segment positioned in a second plane extending at a right angle relative to the longitudinal axis of the internal combustion engine from the cylinder axis, wherein in planes of the cylinder axis between said first and said second plane said first and said second spherical segments have a continuous transition into one another;
said third delimiting surface having a slant such that, beginning at an end of said third delimiting surface proximal to said second delimiting surface and proceeding in a direction toward a distal end of said third delimiting surface, a distance a between said third delimiting surface and said second delimiting surface increases corresponding to a widening of a contour of an injected fuel jet ejected from the multiport injection system; and
said openings, when viewed in a direction of the cylinder axis, arranged diagonal to a longitudinal axis of the internal combustion engine.

4. A combustion chamber according to claim 3, wherein said third delimiting surface, viewed in a direction toward said cylinder axis, has radially extending depressions, with a cross-section of said radially extending depressions being shaped according to a shape of the injected fuel jets ejected from the multiport injection system.

* * * * *